(12) United States Patent
Suzuki (10) Patent No.: US 7,644,640 B2
(45) Date of Patent: Jan. 12, 2010

(54) INJECTION-MOLDED RESIN BEVEL GEAR

(75) Inventor: Yasuhiro Suzuki, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/004,342

(22) Filed: Dec. 20, 2007

(65) Prior Publication Data

US 2008/0173119 A1     Jul. 24, 2008

(30) Foreign Application Priority Data

Dec. 27, 2006    (JP)    ............................. 2006-351036

(51) Int. Cl.
    *F16H 1/14*      (2006.01)
(52) U.S. Cl. ................................... 74/423; 74/DIG. 10
(58) Field of Classification Search ............... 74/423, 74/459.5, DIG. 10, 431, 443, 461, 467, 468
See application file for complete search history.

(56) References Cited

U.S. PATENT DOCUMENTS 6,070,484 A *    6/2000   Sakamaki ..................... 74/434

FOREIGN PATENT DOCUMENTS

JP       5-50222       7/1993
JP      10-231917      9/1998

* cited by examiner

*Primary Examiner*—Richard W L Ridley
*Assistant Examiner*—Phillip Johnson
(74) *Attorney, Agent, or Firm*—William L. Androlia; H. Henry Koda (57) ABSTRACT

A rim-shaped section of a teeth section with the same thickness among a bottomland and the same thickness as that of a web. An outward-radial-direction end of the web is connected to an inner end side of the rim-shaped section. In the rim-shaped section, a section from a teeth section connecting section of the web to an outer end of the ring-shaped rim-shaped section is connected to an outer circumferential surface of the boss by a plurality of first radial direction ribs. In the rim-shaped section, a section from the teeth section connecting section of the web to a tooth-width-direction center section is connected to an outward-radial-direction end of second radial direction ribs. The first and the second radial direction ribs are formed thinner than the web and the ring-shaped rim-shaped section.

9 Claims, 13 Drawing Sheets

INJECTION-MOLDED RESIN BEVEL GEAR

BACKGROUND OF THE INVENTION

1. Field of the Invention

The present invention relates, in particular, to an injection-molded resin bevel gear, among bevel gears transmitting rotational movement between two intersecting axes.

2. Description of the Related Art

Since the past, various bevel gears have been developed to perform power transmission between two intersecting axes in an automobile and the like. These various bevel gears have been put to actual use (refer to Patent Literature 1 and Patent Literature 2).

Figure 12:
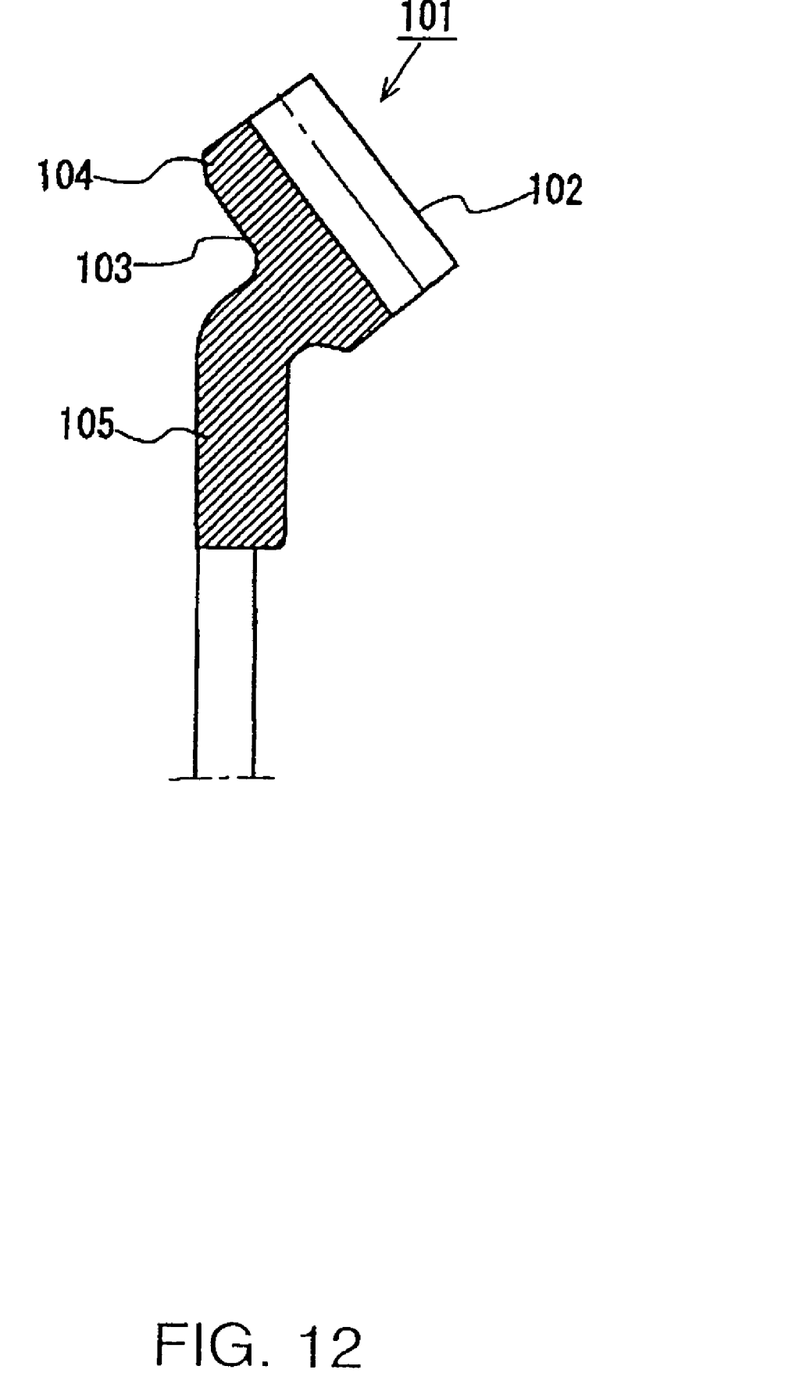
FIG. 12 is a partial cross-sectional view of a bevel gear according to a first conventional example.

For example, to reduce deformation during quenching, a bevel gear 101 such as that shown in FIG. 12 includes a recess section 103 on a backside of a tooth 102. The thickness of a tooth root of the tooth 102 and the thicknesses of a rim-shaped section 104 and a flange section 105 are adjusted (refer to Patent Literature 1).

Figure 13:
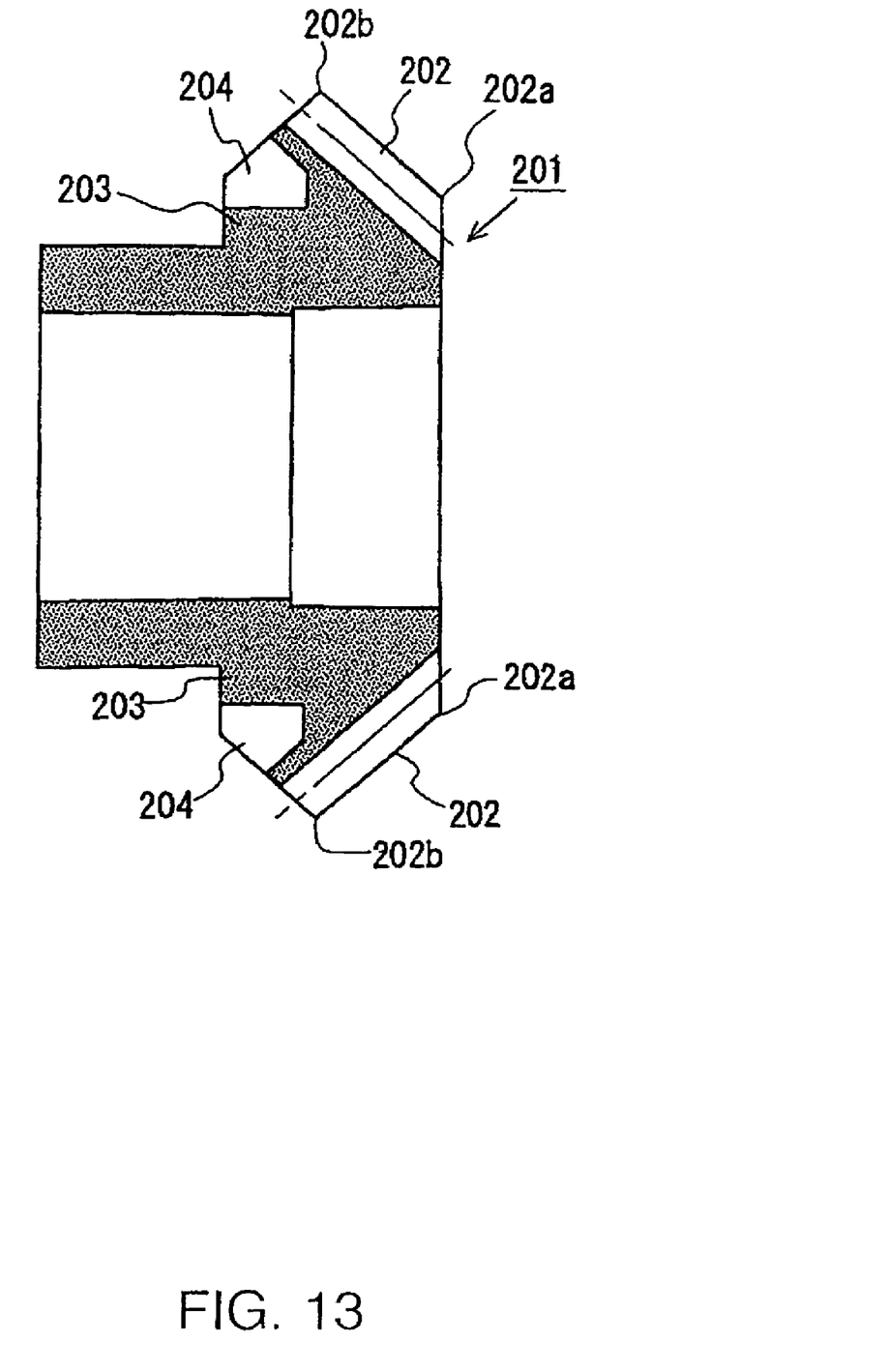
FIG. 13 is a vertical cross-sectional view of a bevel gear according to a second conventional example.

In a bevel gear 201 such as that shown in FIG. 13, to balance support rigidity of an inner end 202a side of a tooth 202 and support rigidity of an outer end 202b side of the tooth 202, reduce sudden deformation of the tooth 202 during meshing and rotational fluctuation attributed to the deformation, and reduce noise level, a balance recess 204 is formed on a support section 203 on the outer end 202b side of the tooth 202 (refer to Patent Literature 2).

In recent years, an injection-molded resin gear having reduced noise during power transmission, lighter weight, and being low in cost, as well as being capable of having higher accuracy, is receiving attention in industries related to precision instruments and precision machinery, and the like. Development of an injection-molded resin bevel gear having high accuracy and high rigidity is demanded.

Patent Literature 1: Japanese Patent Laid-open Publication No. Heisei 10-231917

Patent Literature 2: Utility Model-Laid-open Publication No. Heisei 5-50222

However, the bevel gear 101 shown in FIG. 12 is made of metal. Therefore, a technology related to a structure suppressing reduction in gear accuracy caused by shrinkage of resin after injection molding and securing sufficient rigidity is not disclosed. The bevel gear 101 cannot be applied to the development of the injection-molded resin bevel gear.

In the bevel gear 201 shown in FIG. 13, the thickness of the tooth 202 at the support section 203 differs greatly between the inner end 202a side and the outer end 202b side. Therefore, even when the bevel gear 201 is applied to an injection-molded bevel-gear, the amount of shrinkage after injection molding differs greatly between the support section 203 on the inner end 202a side and the support section 203 on the outer end 202b side. Therefore, a high level of gear accuracy cannot be acquired.

SUMMARY OF THE INVENTION

An object of the present invention is to provide an injection-molded resin bevel gear having high accuracy and high rigidity that can meet demands of the precision-instrument industry and the like through design of a gear structure.

The invention is related to an injection-molded resin bevel gear including a boss, a web, and a teeth section. The boss has an axis hole. The web spreads from an outer circumference side of the boss in an outward radial direction. The teeth section is positioned on an outward-radial-direction side of the web. In the invention, the teeth section has a ring-shaped, rim-shaped section having almost the same thickness along a bottomland and formed to have almost the same thickness as the thickness of the web. The outward-radial-direction side of the web is connected to an inner end of the rim-shaped section that is one end in a tooth-width direction. In the rim-shaped section, a section from the section to which the web is connected to the vicinity of an outer end that is the other end in the tooth-width direction is connected to an outward-radial-direction end of a plurality of evenly-placed first radial direction ribs extending such as to radiate from the outer circumference side of the boss in the outward radial direction and extending along a side surface of the web. In the rim-shaped section, a section positioned between adjacent first radial direction ribs and closer to the inner end that the section to which the first radial direction ribs are connected in the vicinity of the outer end is connected to the outward-radial-direction ends of second radial direction ribs projecting from the side surface of the web. The thicknesses of the first radial direction ribs and the second radial direction ribs are formed thinner than the thicknesses of the web and the rib-shaped section such that a flow of molten resin during injection molding can be preferentially led from the web to the teeth section.

The invention is further characterized by a shape of the web. In other words, the outward-radial-direction side of the web includes a horizontal beam section and a base end section. The horizontal beam section bends in a direction along a direction in which a rotational center axes extends such as to project towards the inner end side of the teeth section. The base end section extends from a tip of the horizontal beam section in the outward radial direction and is connected to the outer circumference side of the boss.

The invention is also characterized by the teeth section. In other words, the teeth section has a roughly disc-shaped, shoulder-shaped section that is positioned away from an outer end position of the teeth and on the outer end side of the rim-shaped section. The shoulder-shaped section extends from the rim-shaped section in the outward radial direction to a position with almost a same diameter as a crown diameter.

The invention is still further characterized by the teeth section. In other words, the teeth section has a roughly disc-shaped, shoulder-shaped section that is positioned away from an outer end position of the teeth and on the outer end side of the rim-shaped section. The shoulder-shaped section extends from the rim-shaped section in the outward radial direction to a position with almost a same diameter as a crown diameter.

The injection-molded resin bevel gear of the invention can simultaneously achieve increased gear accuracy and increased rigidity in gear strength.

DETAILED DESCRIPTION OF THE PREFERRED EMBODIMENT

Embodiments of the present invention will be described in detail, with reference to the drawings.

Figure 1:
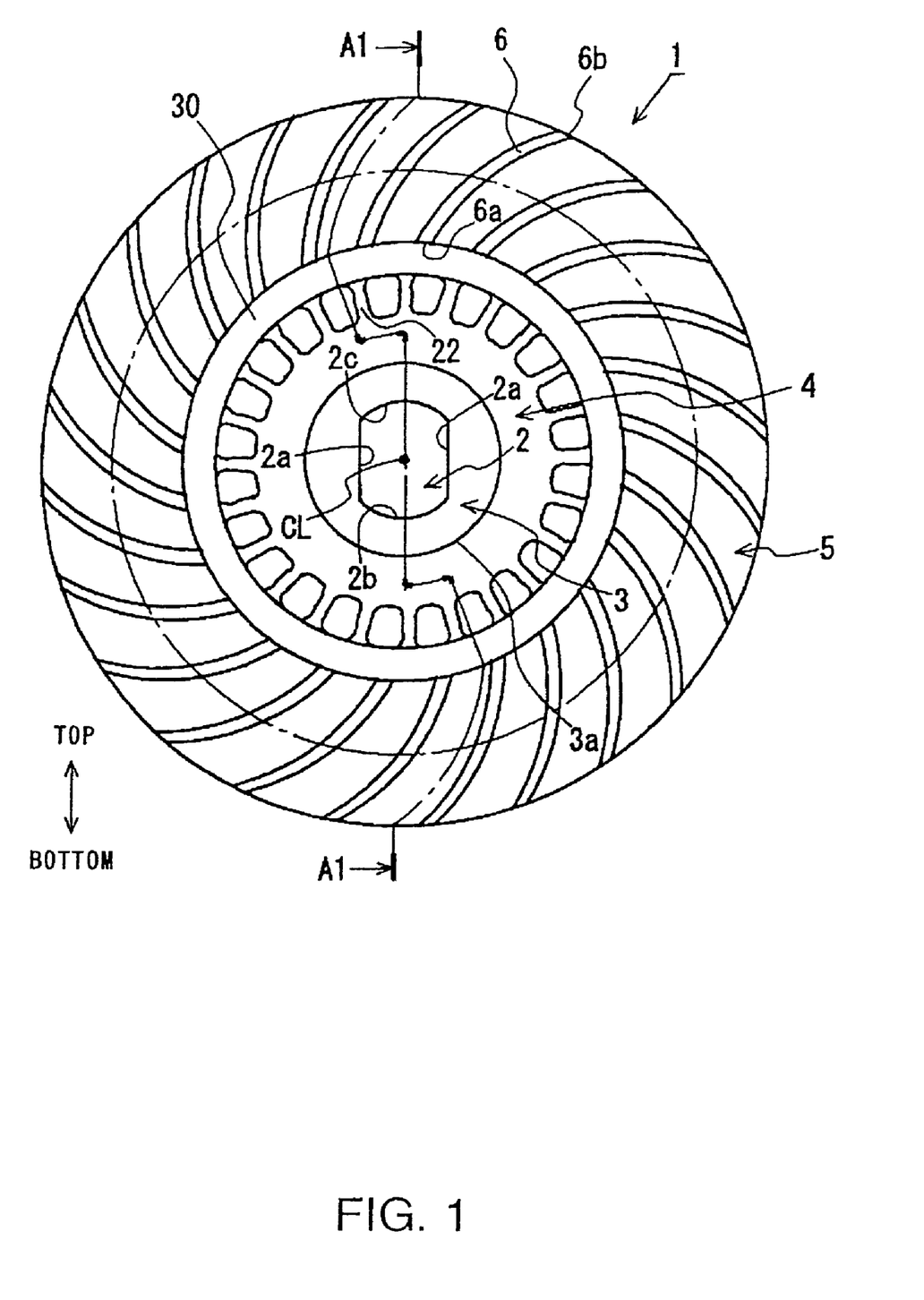
FIG. 1 is a front view of an injection-molded resin bevel gear according to an embodiment of the present invention (viewed from the direction of an arrow F in FIG. 2)
Figure 2:
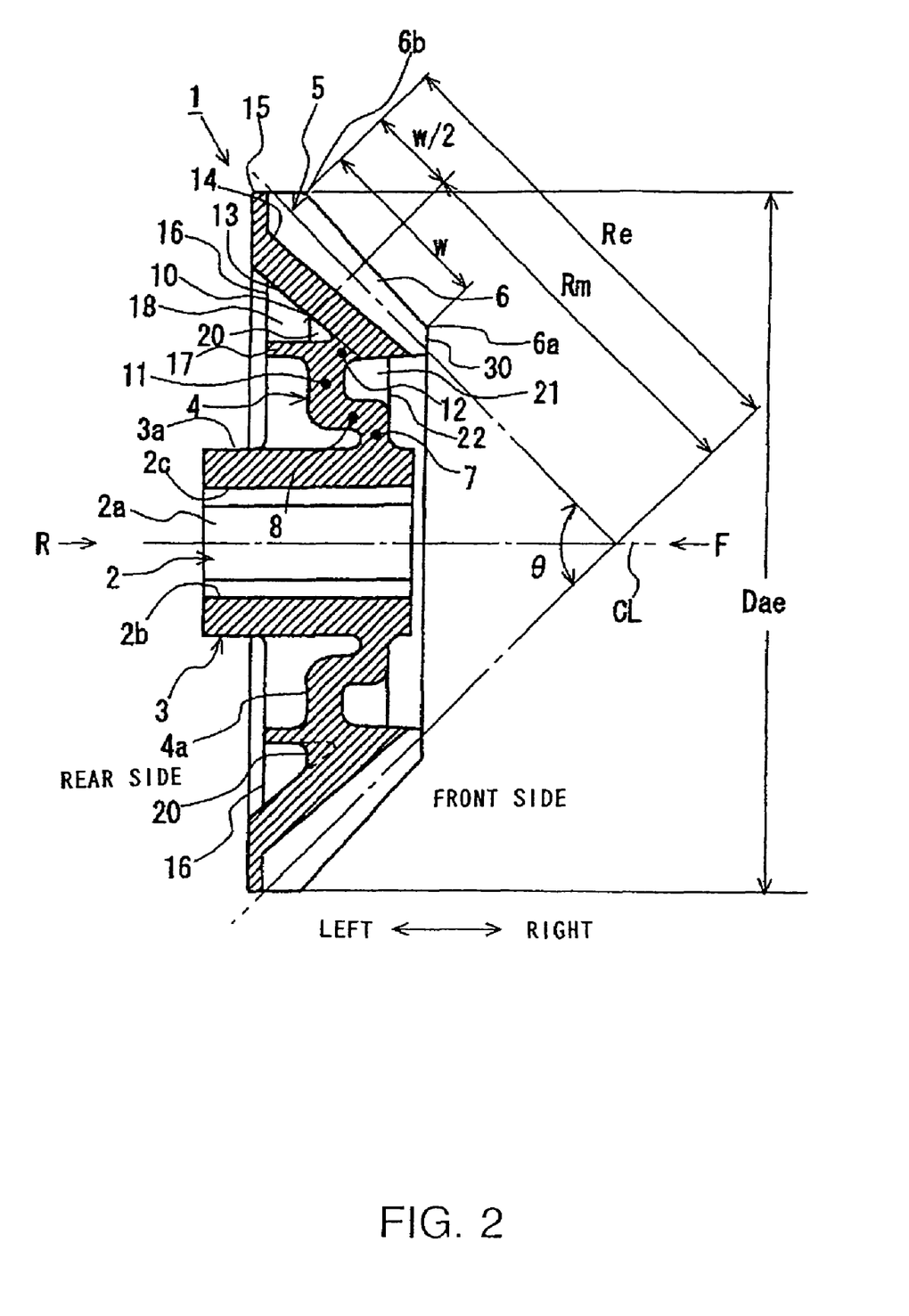
FIG. 2 is a cross-sectional view of FIG. 1 taken along line A1-A1.
Figure 3:
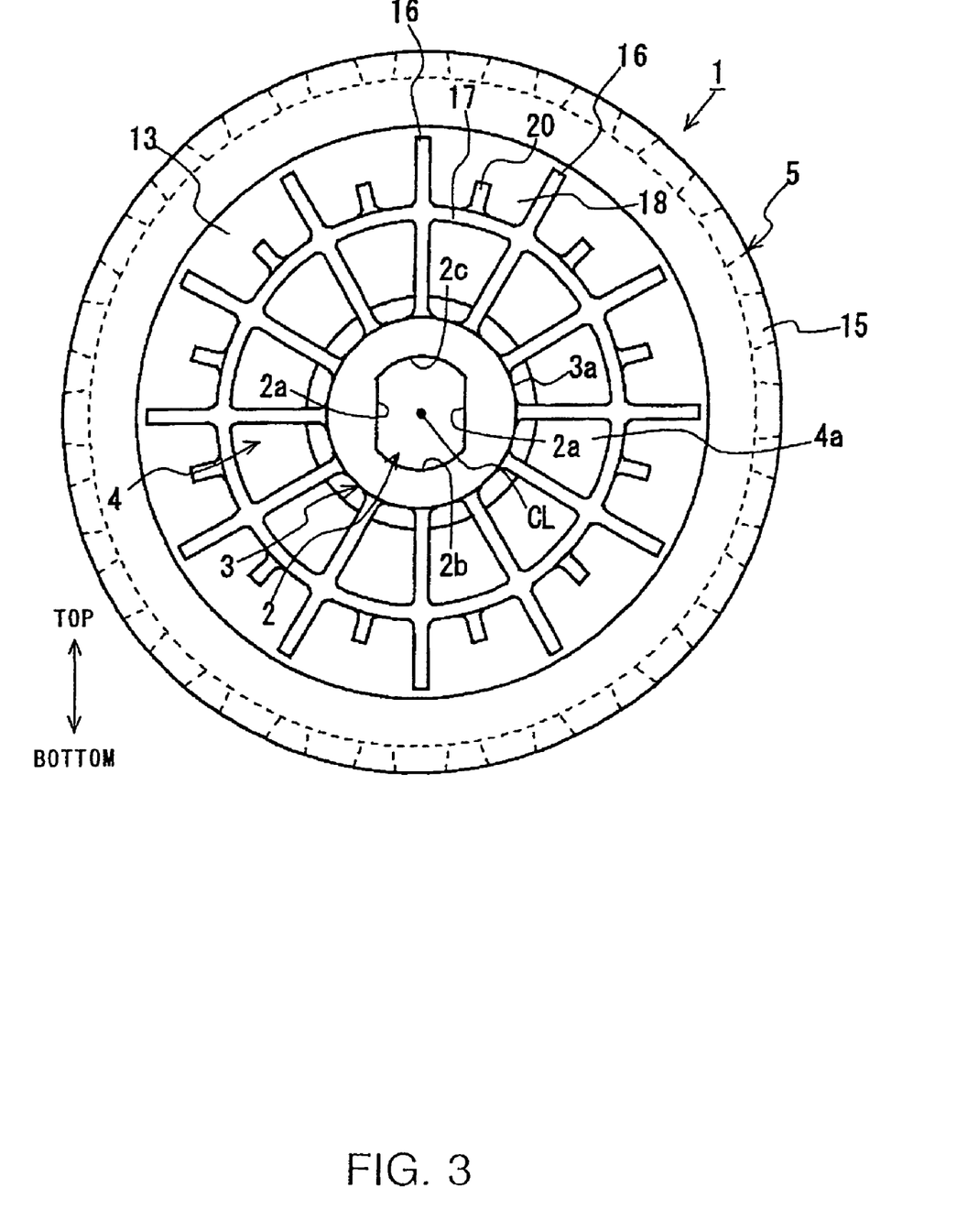
FIG. 3 is a rear view of the injection-molded resin bevel gear according to an embodiment of the present invention (viewed from the direction of an arrow R in FIG. 2)

FIG. 1 to FIG. 3 show an injection-molded resin bevel gear 1 according to an embodiment of the present invention. Among the diagrams, FIG. 1 is a front view of the injection-molded resin bevel gear 1 (viewed from the direction of an arrow F in FIG. 2). FIG. 2 is a cross-sectional view taken along line A1-A1 in FIG. 1. FIG. 3 is a rear view of the injection-molded resin bevel gear 1 (viewed from the direction of an arrow R in FIG. 2).

As shown in the diagrams, a boss 3, a web 4, and a teeth section 5 are formed in the injection-molded resin bevel gear 1. The boss 3 has an axis hole 2 in a rotational center section. The web 4 is roughly disk-shaped and extends in an outward radial direction from the outer circumferential side of the boss 3. The teeth section 5 is formed on the outward-radial-direction-end side of the web 4.

Among these, the overall shape of the boss 3 is almost cylindrical. The axis hole 2 in the rotational center section is engaged with a width-across-flat axis (not shown) such as to be capable of sliding and incapable of relative rotation. The boss 3 rotates integrally with the axis. In other words, the axis hole 2 in the boss 3 includes a pair of flat surface sections 2a and 2a, a first arc-shaped section 2b, and a second arc-shaped section 2c. The pair of flat surface sections 2a and 2a functions as a rotation stopper for the axis. The first arc-shaped section 2b is connected with one end side of the pair of flat surface sections 2a and 2a (the lower end side in FIG. 1 and FIG. 3). The second arc-shaped section 2c is connected to the other end side of the pair of flat surface sections 2a and 2a (the upper end side in FIG. 1 and FIG. 3). The outer circumferential shape of the boss 3 is almost circular. The boss 3 is formed such that an inner circumferential end of the web 4 is positioned in a section on the outer circumferential surface 3a near an inner end 6a side of a tooth 6.

The web 4 includes a base end section 7, a horizontal beam section 8, a vertical beam section 11, and a teeth section connecting section 12. The base end section 7 extends in an outward radial direction from the section on the outer circumferential surface 3a of the boss 3 near the inner end 6a side of the teeth 6. The horizontal beam 8 bends almost horizontally from the tip of the base end 7 (along a direction in which a rotational center axis CL extends) and extends towards the rear side (the left-hand side in FIG. 2). The vertical beam 11 bends from the tip of the horizontal beam 8 in the outward radial direction and extends towards the vicinity of a tooth-width-direction center section 10 on the inner circumferential side of the teeth section 5. The teeth section connecting section 12 bends from the outer end of the vertical beam section 11 and connects to the inner end 6a side of the teeth section 5. The web 4 is configured such that the thicknesses of the base end section 7, the horizontal beam section 8, the vertical beam section 11, and the teeth section connecting section 12 are almost the same (thickness difference of about ±10%, taking into consideration manufacturing errors and the like). The tooth-width-direction center section 10 is a measurement position that is a conical distance Re subtracted by half of a tooth width measurement w (w/2) (or a position of a center conical distance Rm). The tooth-width-direction center section 10 is a position at which a line perpendicular to a pitch circle intersects with the inner circumferential surface of a rim-shaped section 13.

The teeth section 5 includes a ring-shaped rim-shaped section 13. The inner circumference measurement of the rim-shaped section 13 increases gradually in a tapered manner from the inner end 6a side of the tooth 6 towards the outer end 6b side. A plurality of teeth 6 are formed on the outer circumferential surface side of the rim-shaped section 13. (Although spiral teeth are shown in the present embodiment, the teeth are not limited thereto. Straight teeth and helical teeth can also be used.) Here, the rim-shaped section 13 is formed such that the thickness from the inner end 6a side to the outer end 6b side of the tooth 6 is almost the same along a bottomland 14. The thickness of the rim-shaped section is almost the same as the thickness of the web 4 (thickness difference of about ±10%, taking into consideration manufacturing errors and the like). According to the embodiment, the injection-molded resin bevel gear 1 is formed with a root angle corresponding to an axial angle θ. A slope angle of the inner circumferential surface of the rim-shaped section 13 is also set to an angle corresponding to the root angle.

As shown in FIG. 2, the teeth section 5 is formed such that an almost disc-shaped shoulder-shaped section 15 has the same diameter as a crown diameter Dae. The shoulder-shaped section 15 stands from the bottomland 14 of the outer end 6b of the tooth 6 in the outward radial direction. The shoulder-shaped section 15 is positioned such that the end of the shoulder-shaped section 15 in the outward radial direction is positioned towards the rear side than the outer end 6a of the tooth 6. The shoulder-shaped section 15 is positioned away from a meshing position with a mating bevel gear. According to the embodiment, the outside diameter measurement of the shoulder-shaped section 15 is the same diameter as the crown diameter Dae. However, this is not limited thereto. As long as formation defects, such as gas burns and sink marks, do not occur on the teeth 6, the outside diameter measurement of the shoulder-shaped section 15 can be larger or smaller than the crown diameter Dae. According to the embodiment, the shoulder-shaped section 15 has a circular outer shape. However, this is not limited thereto. The outer shape can be a polygonal shape or other deformed shapes similar to a circle.

As shown in FIG. 2 and FIG. 3, a section on the inner circumferential surface side of the rim-shaped section 13 positioned on the rear side of the web 4 (the left-hand side in FIG. 2) is connected to an outward-radial-direction end of first radial direction ribs 16. The first radial direction ribs 16 extend such as to be evenly-spaced and radiating from the outer circumferential surface 3a of the boss 3 in the outward radial direction. The first radial direction ribs 16 also extend along a side surface 4a of the web 4 on the rear side. As a result, the boss 3, the side surface 4a of the web 4 on the rear side, and the rim-shaped section 13 are integrally connected by the first radial direction ribs 16.

The plurality of first radial direction ribs 16 are connected by circumferential direction ribs 17 that project from an upper end of the vertical beam section 11 of the web 4 towards the rear side (the left-hand side direction in FIG. 2) (refer to FIG. 3). As shown in FIG. 3, the circumferential direction ribs 17 have almost the same thickness as the first radial direction ribs 16 and are formed concentric with the boss 3. The circumferential direction ribs 17 and the radial direction ribs 16 are formed such as not to protrude toward the rear side farther than the rear-side end section of the teeth section 5 (the left-hand side direction in FIG. 2), to prevent interference with other adjacently-disposed components (not shown).

As shown in FIG. 2, between adjacent first radial direction ribs 16 and 16, a recess (gap) 18 with a roughly triangular circumference is formed. The recess 18 with a roughly triangular circumference is formed by the circumferential direction rib 17, the web 4, and the rim-shaped section 13. Second radial direction ribs 20 are formed in the recess 18 with a roughly triangular circumference, such as to straddle (connect with) the upper end section (outer-circumferential-side end section) of the vertical beam section 11 of the web 4 and the rim-shaped section 13. The second radial direction ribs 20 can support the roughly-center section in a direction along the tooth width w and the vicinity of the inner circumferential side of the rim-shaped section 13 (above-described tooth-width-direction center section 10). The second radial direction ribs 20 extend along radial lines from the rotational center axis CL toward the outward radial direction, as does the first radial direction ribs 16. The second radial direction ribs 20 are formed such that the rear-side end section is positioned on a line extending towards the outward radial direction of the rear-side end section of the vertical beam section 11 of the web 4 (see FIG. 3).

A plurality of third radial direction ribs 11 are formed evenly-spaced in a ring-shaped space (a ring-shaped recess) 21 on the front side of the web 4. The space 21 is formed by the horizontal beam section 8 and the vertical beam section 11 of the web 4, and the inner end 6a side of the teeth section 5. The third radial direction ribs 21 extend along lines radiating and extending in the outward radial direction, with the rotational center axis CL as the center (see FIG. 1). The front-side end section of the third radial direction ribs 22 is positioned on a line extending from the front-side end section of the base end section 7 of the web 4 (see FIG. 2).

Figure 4:
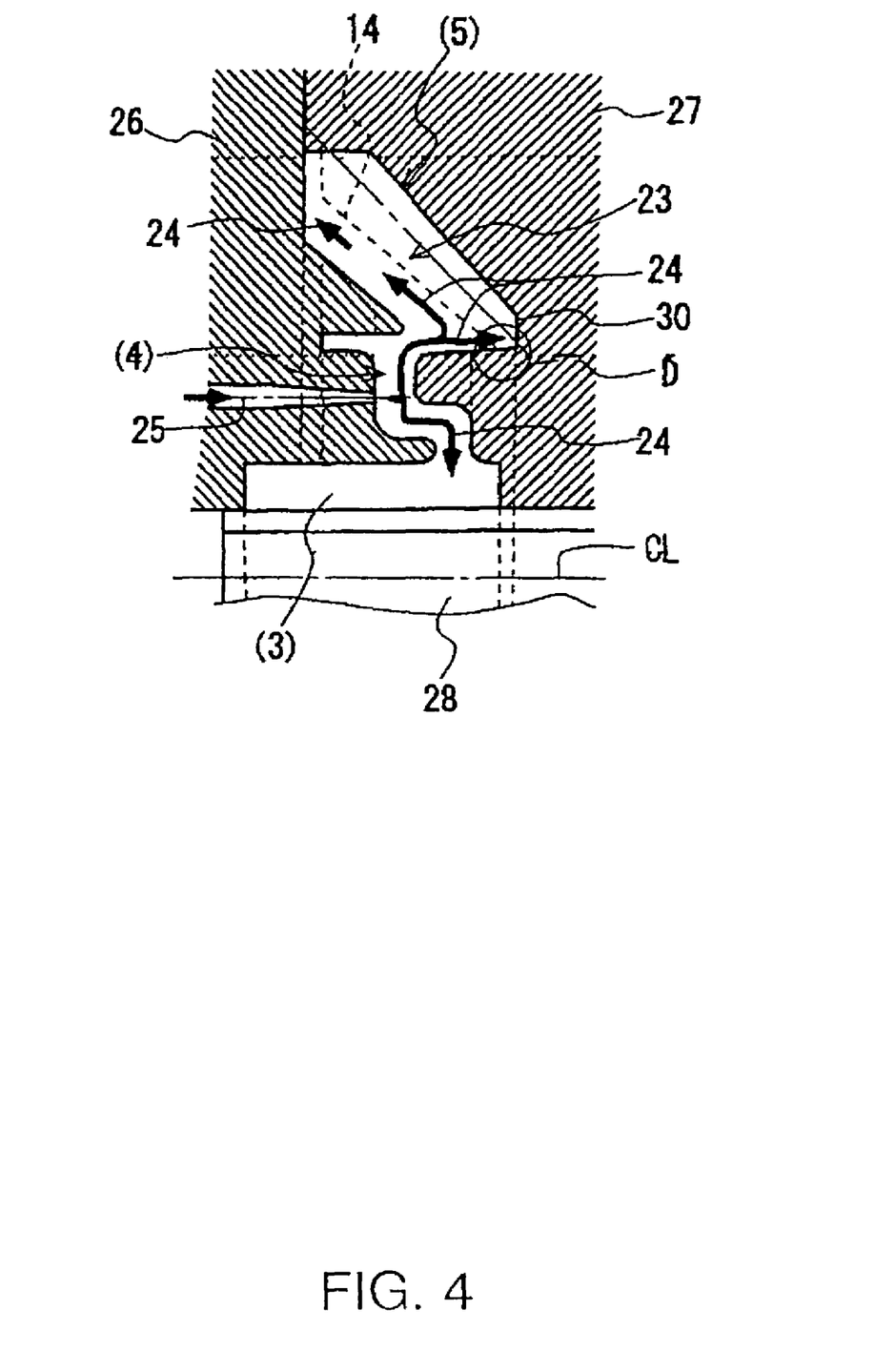
FIG. 4 is a cross-sectional view schematically showing a structure of a mold for injection molding and a flow of molten resin within a cavity.

The thicknesses of the first radial direction ribs 16, the second radial direction ribs 20, and the third radial direction ribs 22 are almost the same. The first radial direction ribs 16, the second radial direction ribs 20, and the third radial direction ribs 22 are formed such as to be thinner than the thickness of the web 4 and the rim-shaped section 13, taking into consideration the flow of molten resin within the cavity during injection molding. In other words, the thicknesses of the first radial direction ribs 16, the second radial direction ribs 20, and the third radial direction ribs 22 are formed thinner than the thickness of the web 4 and the rim-shaped section 13 such that a flow 24 of the molten resin within a cavity 23 during injection molding can be preferentially led from a section (4) corresponding to the web 4 to a section (5) corresponding to the teeth section, as shown in FIG. 4. A gate 25 is open particularly on a rear side of a position corresponding with the vertical beam section, among the section (4) in the cavity 23 corresponding with the web. The flow 24 of the molten resin is divided into the outward radial direction of the section (4) corresponding with the web (on the side of the section [5] corresponding with the teeth section) and the inward radial direction (on the side of a section [3] corresponding with the boss). In FIG. 4, a mold 25 for injection molding includes a first mold 26, a second mold 27, and an axis mold 28.

Each connector section is formed with a smooth, roughly arc-shaped curved surface to prevent concentration of stress (see FIG. 2). The connector sections are a connecting section between the web 4 and the first radial direction ribs 16, a connecting section between the web 4 and the second radial direction ribs 20, a connecting section between the web 4 and the third radial direction ribs 22, a connecting section between the web 4 and the boss 3, a connecting section between the web 4 and the rim-shaped section 13, a connecting section among each corner section at which the web 4 bends, the first radial direction ribs 16, the second radial direction ribs 20, the third radial direction ribs 22, and the rim-shaped section 13, a connecting section between the first radial direction ribs 16 and the boss 3, and the like.

In the injection-molded resin bevel gear 1 according to the embodiment, configured as described above, the thicknesses of the web 4 and the rim-shaped section 13 are almost the same. The thicknesses of the first radial direction ribs 16, the second radial direction ribs 20, and the third radial direction ribs 22 are thinner than the web 4 and the rim-shaped section 13. Therefore, the flow 24 of the molten resin during injection molding is lead from the web 4 to the inner end 6a side of the teeth section 5. The flow 24 of the molten resin is further preferentially led from the inner end 6a side of the teeth section 5 to the outer end 6b side. Then, the molten resin is lead to the first radial direction ribs 16, the second radial direction ribs 20, and the third radial direction ribs 22 (see FIG. 2 and FIG. 4). As a result, the teeth section 5 can be filled with the molten resin with the desired injection-molding pressure (first effect).

The first radial direction ribs 16, the second radial direction ribs 20, and the third radial direction ribs 22 supporting the rim-shaped section 13 of the teeth section 5 from the inner circumferential surface are formed thinner than the thickness of the rim-shaped section 13. The length of the connecting section between the second radial direction ribs 20 and the rim-shaped section 13 is shorter than the length of the connecting section between the first radial direction ribs 16 and the rim-shaped section 13. As a result, the injection-molded resin bevel gear 1 according to the embodiment can reduce shrinkage in the connecting sections between the teeth section 5 and the first radial direction ribs 16, the teeth section 5 and the second radial direction ribs 20, and the teeth section 5 and the third radial direction ribs 22 in the outward radial direction that occurs after injection molding. Increased gear accuracy can be achieved (second effect). When the thicknesses of the first radial direction ribs 16, the second radial direction ribs 20, and the third radial direction ribs 22a are formed to be almost the same as the thickness of the rim-shaped section 13, or the length of the connecting section between the second radial direction ribs 20 and the rim-shaped section 13 and the length of the connecting section between the first radial direction ribs 16 and the rim-shaped section 13 are the same, the amount of shrinkage of the teeth section 5 in the outward radial direction partially increases (in the connecting sections with first radial direction ribs 16, the second radial direction ribs 20, and the third radial direction ribs 22). The desired gear accuracy is difficult to achieve.

According to the embodiment, the teeth section connecting section 12 of the web 4 extends in an almost horizontal direction towards the inner end 6a side of the teeth 6 (along the direction in which the rotational center axis CL extends) and is connected to the inner end 6a side of the teeth section 5. The flow 24 of molten resin from the web 4 to the teeth section 5 during injection-molding heads towards a side surface 30 on the inner end 6a side of the teeth 6 that is a section that is not involved in meshing (section D in FIG. 4). Therefore, formation defects, such as voids and sink marks, do not occur in sections meshing with the mating bevel gear (third effect).

According to the embodiment, the shoulder-shaped section 15 having the same shape as the crown diameter Dae is formed in a section on the outer end 6b side of the teeth section 5 that does not mesh with the mating bevel gear. Compression of residual gas within the cavity 23 during injection molding occurs on the outer end of the shoulder-shaped section 15. Therefore, formation defects, such as gas burns and sink marks, do not occur in the teeth 6 performing meshing (fourth effect).

As the synergetic effect of the first to fourth effects, the injection-molded resin bevel gear 1 according to the embodiment is a highly accurate, high-quality gear that cannot be achieved by the injection-molded resin bevel gear 1 to which the conventional examples are applied (fifth effect).

In the injection-molded resin bevel gear 1 according to the embodiment, the horizontal beam section 8 of the web 4 projects almost horizontally from the outward-radial-direction end side of the vertical beam section 11 to the inner end 6a side of the teeth 6 (the right-hand side direction in FIG. 2). The base end section 7 of the web 4 is positioned out of alignment with the vertical beam section 11 to the inner end 6a side of the teeth 6 (the right-hand side along the direction in which the rotational center axis CL extends in FIG. 2). When meshing load is applied to the teeth 6, a section straddling the vertical beam section 11 and the base end section of the web 4 undergoes elastic deformation. Impact during meshing of the teeth 6 is buffered. Excessive impact load and flexural stress being placed on the connecting section between the base end section 7 of the web 4 and the boss 3 can be reduced (sixth effect).

In the injection-molded resin bevel gear 1 according to the embodiment, a section from the connecting section of the rim-shaped section 13 with the web 4 to the outer end 6b side of the teeth 6 are supported by the plurality of first radial direction ribs 16. The sections between adjacent first radial direction ribs 16 and 16, from the connecting section of the rim-shaped section 13 with the web 4 to the tooth-width-direction center section 10 of the teeth 6 are supported by the second radial direction ribs 20. Therefore, increased rigidity of the supporting structure of the teeth section 5 can be achieved (seventh effect).

In the injection-molded resin bevel gear 1 according to the embodiment, the third radial direction ribs 22 support the section from the connecting section of the rim-shaped section 16 with the web 4 to the inner end 6a side of the teeth 6. Therefore, as a synergetic effect with the seventh effect, a significantly increased rigidity of the support structure of the teeth section 5 can be achieved (eighth effect).

In the injection-molded resin bevel gear 1 according to the embodiment, the increase in the rigidity of the support structure of the teeth section 5 can be achieved, as described above. Therefore, deformation of the teeth section caused by the meshing load placed during power transmission can be suppressed to a small amount. A highly accurate rotation transmission can be performed (ninth effect).

As described above, the injection-molded resin bevel gear 1 according to the embodiment can simultaneously achieve increase in gear accuracy and increase in rigidity of the gear strength.

FIRST VARIATION EXAMPLE

Figure 5:
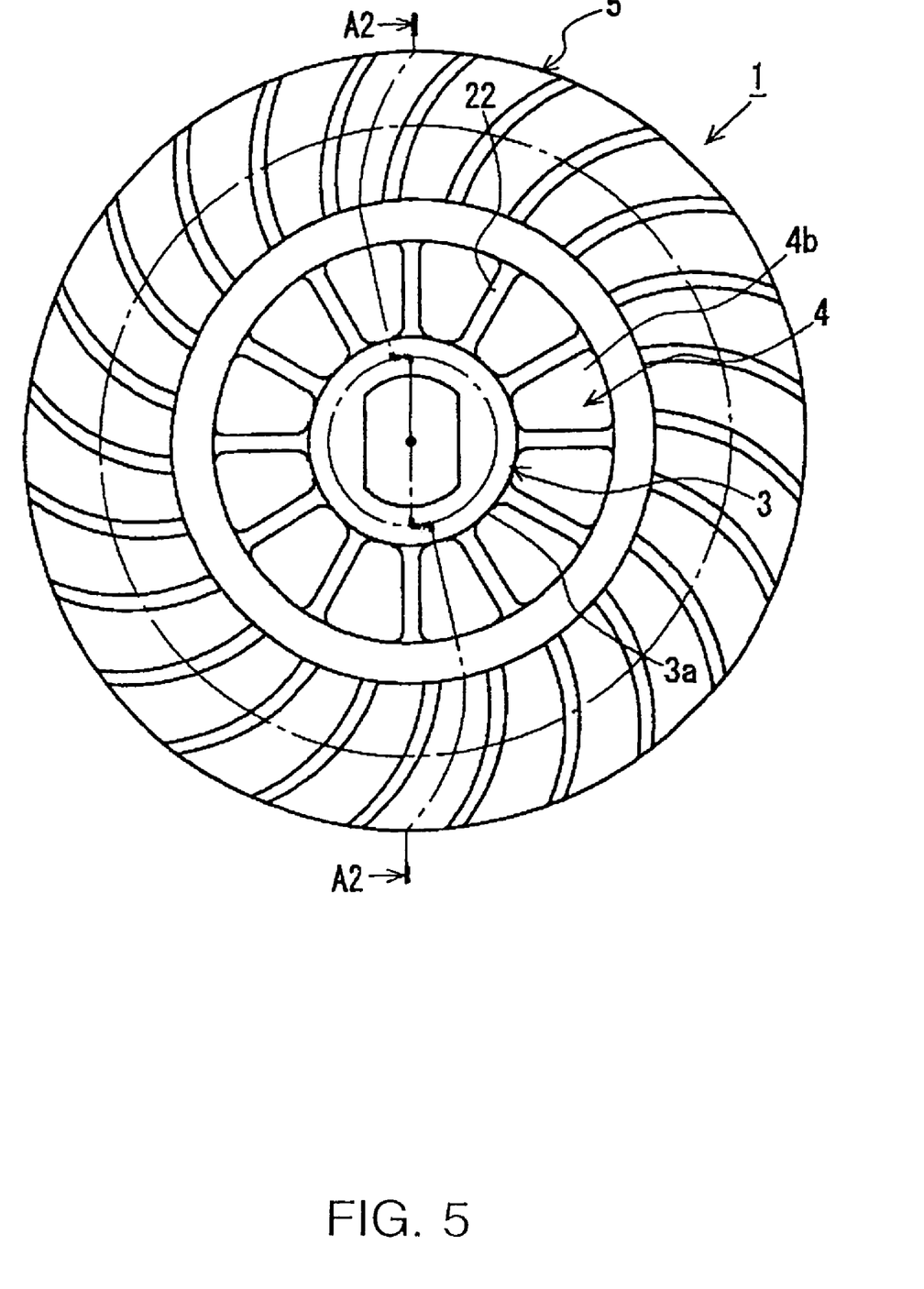
FIG. 5 is a front view of an injection-molded resin bevel gear according to a first variation example of the present invention, corresponding with FIG. 1.
Figure 6:
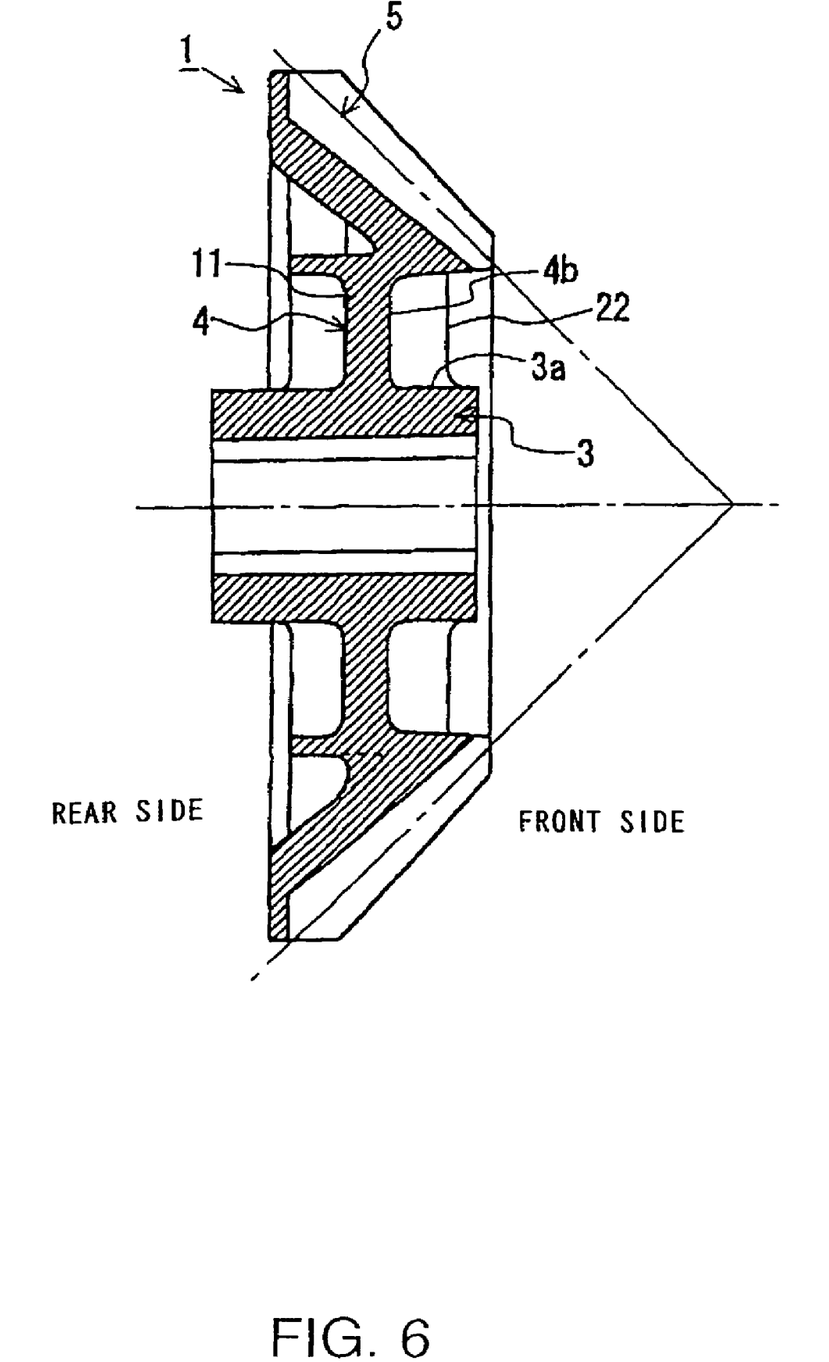
FIG. 6 is a cross-sectional view of FIG. 5 taken along line A2-A2, corresponding with FIG. 2.
Figure 7:
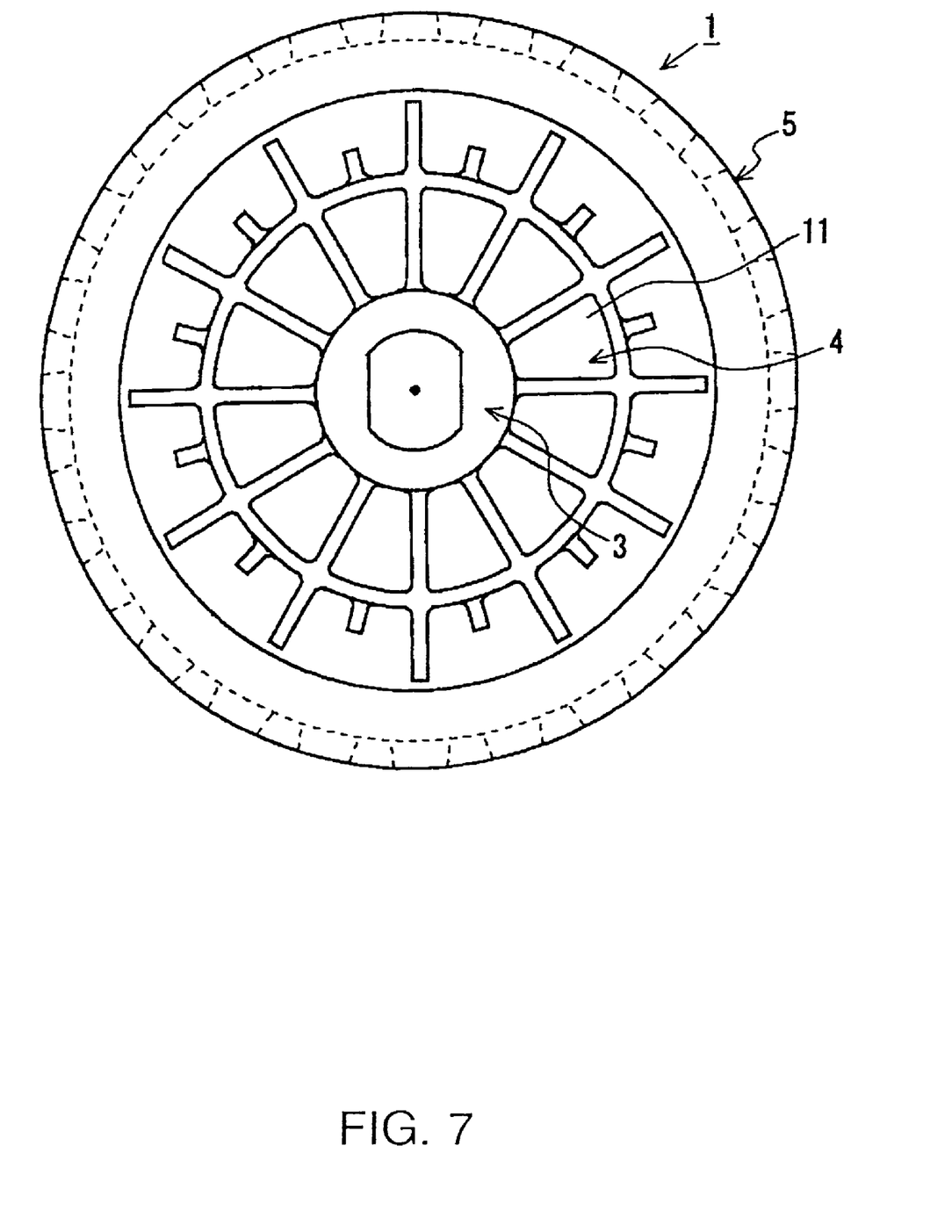
FIG. 7 is a rear view of the injection-molded resin bevel gear according to the first variation example of the present invention, corresponding with FIG. 3.

FIG. 5 to FIG. 7 show an injection-molded resin bevel gear 1 of a first variation example according to the embodiment. In the diagrams, FIG. 5 is a front view of the injection-molded resin bevel gear 1, corresponding with FIG. 1 according to the embodiment. FIG. 6 is a cross-sectional view taken along line A2-A2 in FIG. 5, corresponding with FIG. 2 according to the embodiment. FIG. 7 is a rear view of the injection-molded resin bevel gear 1, corresponding with FIG. 3 according to the embodiment.

The injection-molded resin bevel gear 1 of the variation example has substantially the same structure as that according to the above-described embodiment, aside from the shape of the web 4 and the third radial direction ribs 22 differing from those according to the above-described embodiment. Therefore, the differences with the above-described embodiment will be explained in the description of the variation example.

In other words, in the injection-molded resin bevel gear 1 of the variation example, the vertical beam section 11 of the web 4 extends in the outward radial direction such as to be directly connected to the boss 3. The horizontal beam section 8 and the base end section 7 according to the above-described embodiment are omitted (see FIG. 2 and FIG. 6). The third radial direction ribs 22 are formed along the side surface 4b of the web 4, from the outer circumference surface 3a of the boss 3 to the inner circumference surface of the teeth section 5 (see FIG. 1 and FIG. 5).

In the injection-molded resin bevel gear 1 of the variation example, the same effects as those achieved according to the above-described embodiment can be achieved other than the impact-buffering effect when the injection-molded resin bevel gear 1 meshes with the mating bevel gear being smaller than that according to the above-described embodiment. The impact-buffering effect is smaller because a structure corresponding to the horizontal beam section 8 and the base end section 7 according to the embodiment (the curved-structure section in web 4) is not present.

SECOND VARIATION EXAMPLE

Figure 8:
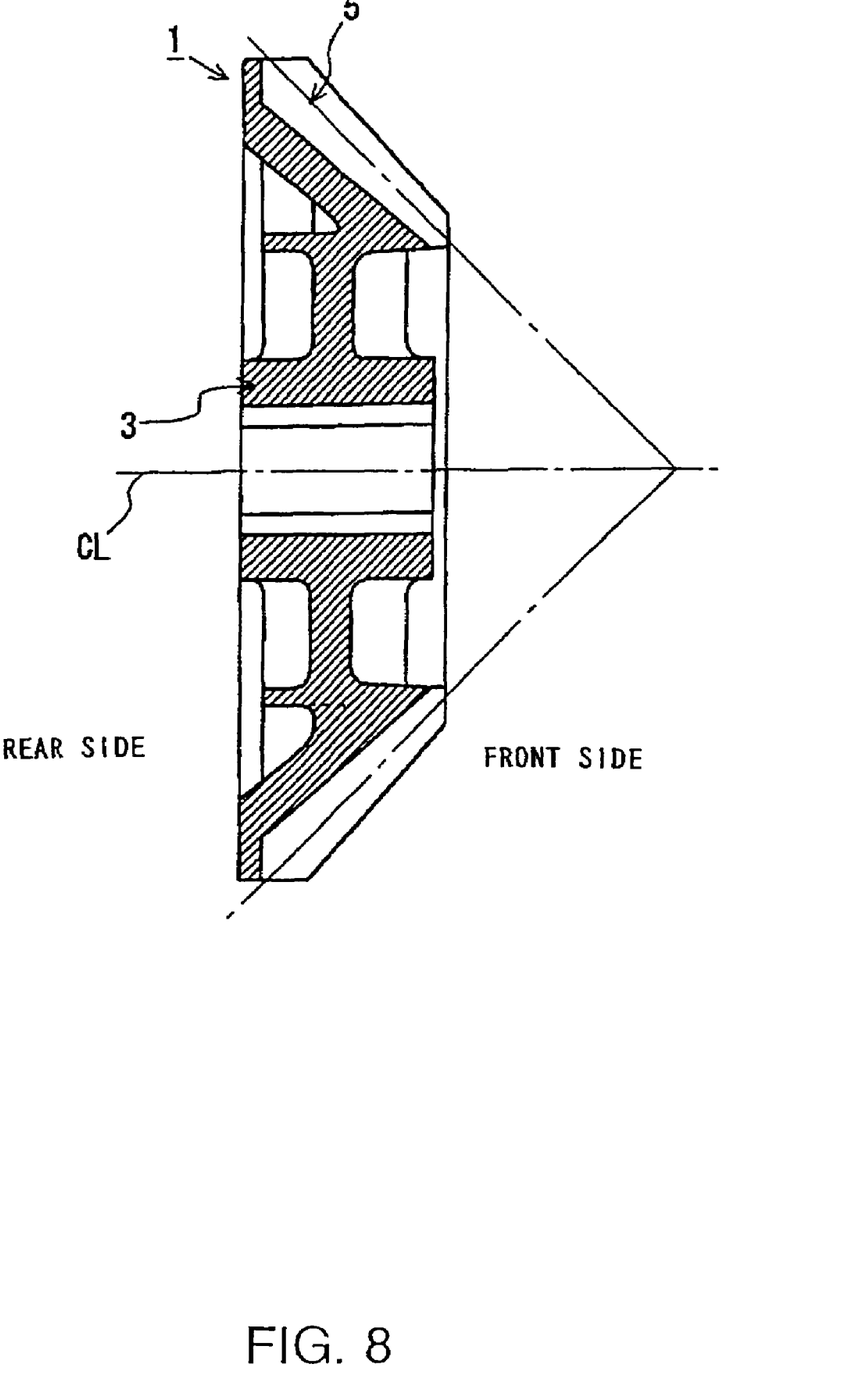
FIG. 8 is a diagram of an injection-molded resin bevel gear according to a second variation example of the present invention, corresponding with FIG. 6 of the first variation example.

FIG. 8 shows an injection-molded resin bevel gear 1 of a second variation example. A variation example of the first variation example is shown. FIG. 8 corresponds to FIG. 6 of the first variation example.

In the injection-molded resin bevel gear 1 of the variation example, the length of the boss 3 along the rotational center axis CL is shorter than that according to the above-described embodiment and of the first variation example. The boss 3 does not project from the rear-side end section of the teeth section 5 further towards the rear side (the left-hand side in FIG. 8).

In the injection-molded resin bevel gear 1 of the second variation example, the same effects as those achieved in the first variation example can be achieved.

THIRD VARIATION EXAMPLE

Figure 9:
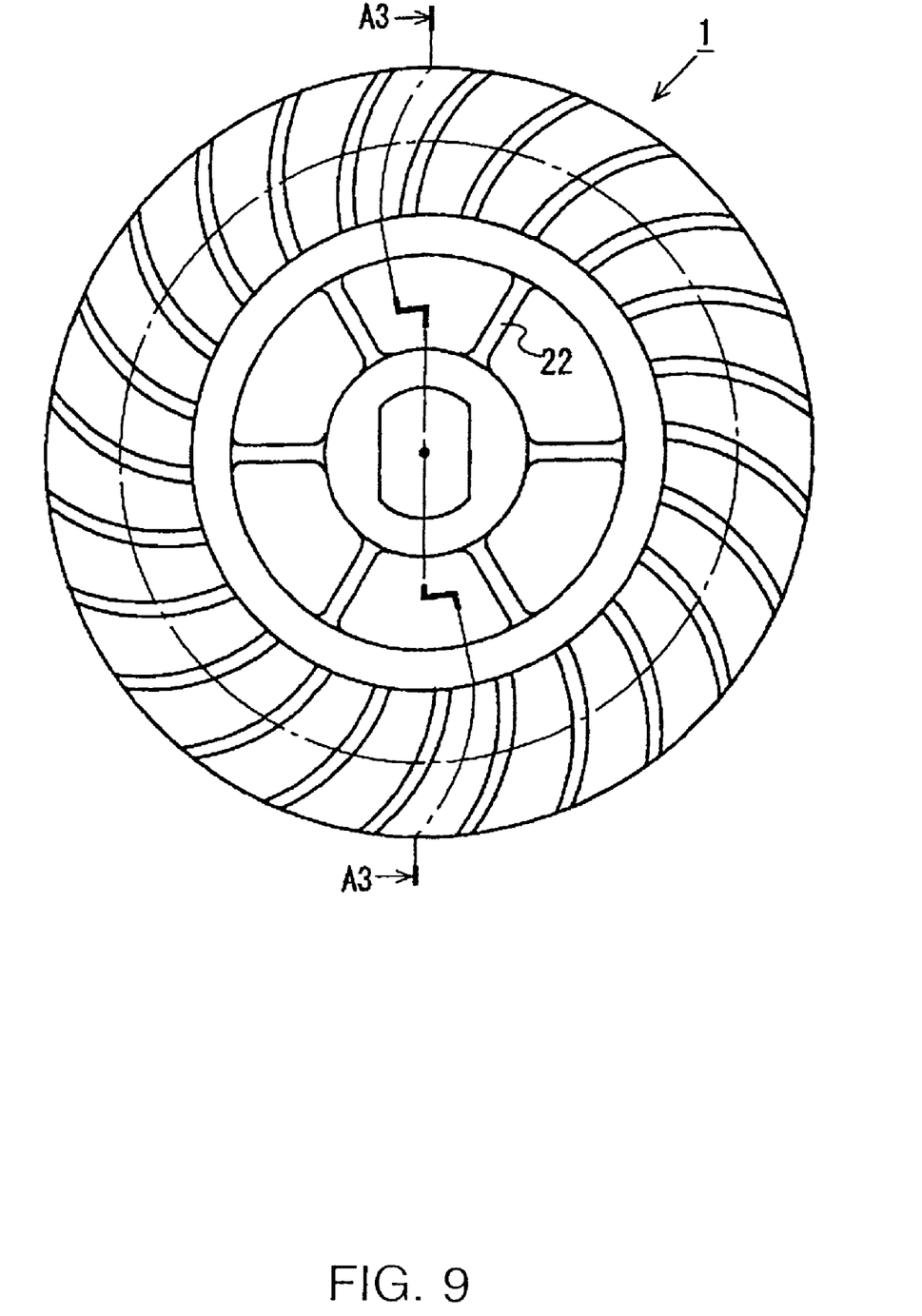
FIG. 9 is a front view of an injection-molded resin bevel gear according to a third variation example of the present invention, corresponding with FIG. 5 of the first variation example.
Figure 10:
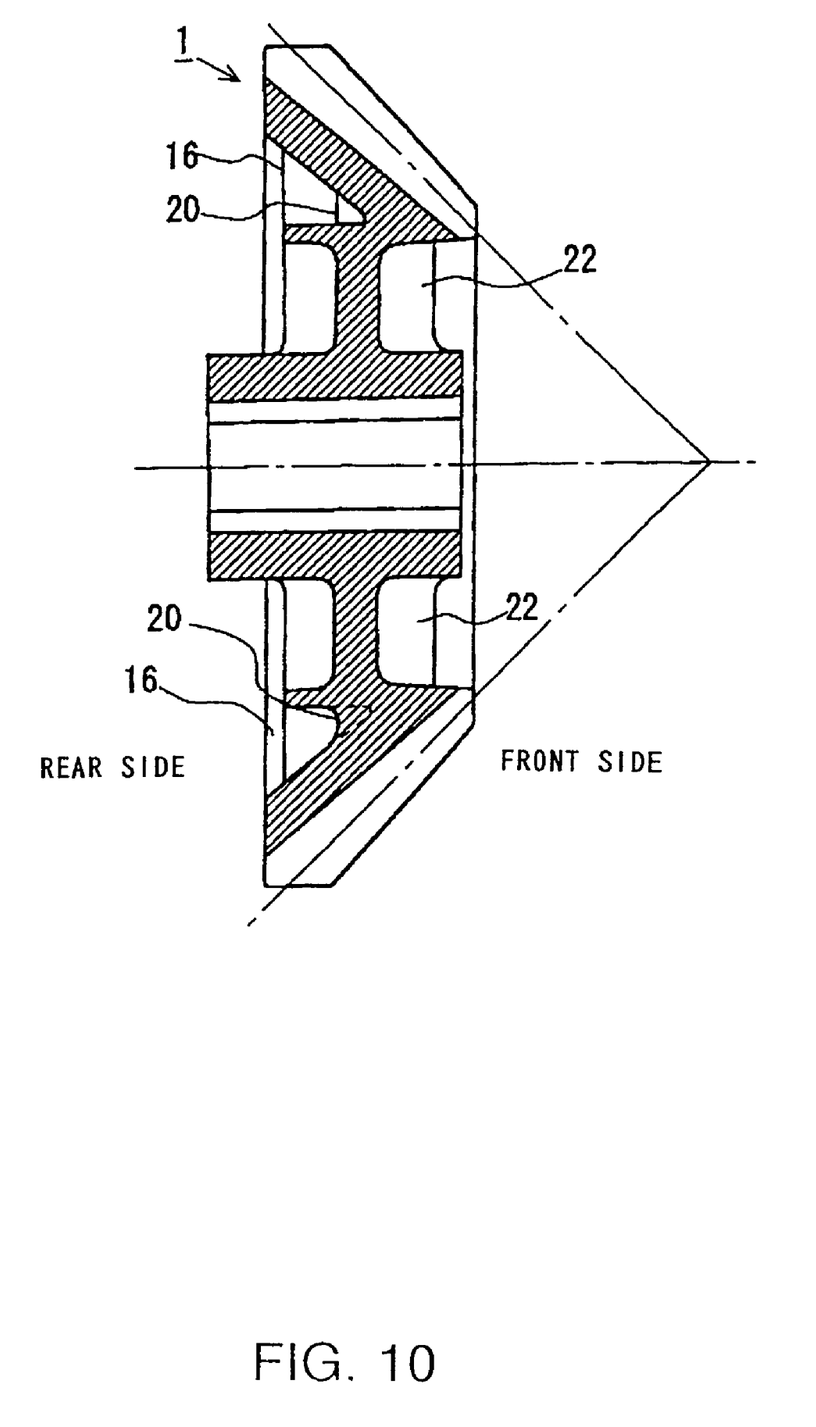
FIG. 10 is a cross-sectional view taken along line A3-A3 in FIG. 9, corresponding with FIG. 6 of the first variation example.
Figure 11:
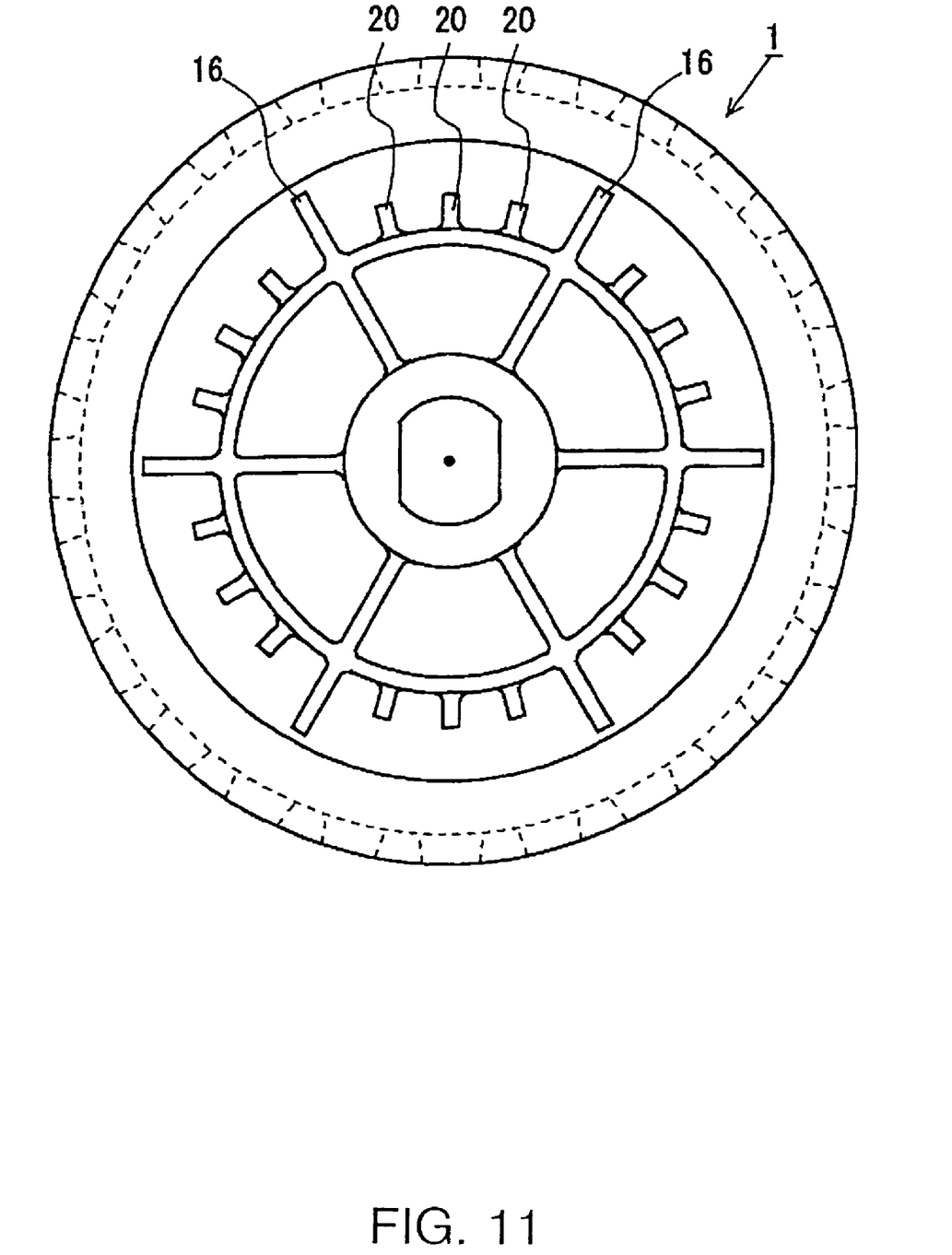
FIG. 11 is a rear view of the injection-molded resin bevel gear according to the third variation example of the present invention, corresponding with FIG. 7 of the first variation example.

FIG. 9 to FIG. 11 show an injection-molded resin bevel gear 1 of a third variation example. Another variation example of the first variation example is shown. Among the diagrams, FIG. 9 is a front view of the injection-molded resin bevel gear 1, corresponding to FIG. 5 of the first variation example. FIG. 10 is a cross-sectional view taken along line A3-A3 in FIG. 9, corresponding to FIG. 6 of the first variation example. FIG. 11 is a rear view of the injection-molded resin bevel gear 1, corresponding to FIG. 7 of the first variation example.

In the injection-molded resin bevel gear 1 of the variation example, the number of first radial direction ribs 16 is less than that of the first variation example. The number of second radial direction ribs 20 disposed between adjacent first radial direction ribs 16 and 16 is increased. The number of third radial direction ribs 22 is less that that of the first variation example.

The numbers of first radial direction ribs 16, second radial direction ribs 20, and third radial direction ribs 22 can be changed depending on the meshing load, as in the injection-molded resin bevel gear 1 of the variation example such as this.

In the injection-molded resin bevel gear 1 of the variation example, the shoulder-shaped section 15 of the first variation example is omitted as a result of the designs of a parting line of the mold for injection-molding and gas-releasing structure of the cavity.

OTHER VARIATION EXAMPLES

According to the above-described embodiments and in the above-described variation examples, the first radial direction ribs 16, the second radial direction ribs 20, the third radial direction ribs 22, and the web 4 support the teeth section 5. However, when the support rigidity of the teeth section 5 reaches a desired rigidity with only the first radial direction ribs 16, the second radial direction ribs 20, and the web 4, the third radial direction ribs 22 can be omitted.

According to the above-described embodiments and in the above-described variation examples, to further enhance the support rigidity of the teeth section 5, the connecting section of the second radial direction ribs 20 with the rim-shaped section 13 can be positioned closer to the outer end 6b side than the tooth-width-direction center section 10. To further enhance gear accuracy, the connecting section of the second radial direction ribs 20 with the rim-shaped section 13 can be positioned closer to the inner end 6a side than the tooth-width-direction center section 10.

According to the above-described embodiment, the shape of the web 4 is not limited to that shown in FIG. 2 as long as the same effect as the sixth effect according to the embodiment can be achieved. For example, the base end section 7 of the web 4 can be curved, dog legged, or shaped to be obliquely angled outwards from the inward radial direction. The horizontal beam section 8 of the web 4 can be curved, shaped to be obliquely angled from the base end section 7 towards the vertical beam section 11, or the like. The vertical beam section 11 can be curved, dog legged, or shaped to be obliquely angled outwards from the inward radial direction.

INDUSTRIAL APPLICABILITY

In the descriptions above, an application of the present invention to an injection-molded resin bevel gear in which two axes intersect is described. However, the present invention can be applied to a hypoid gear that transmits movement between non-parallel and non-intersecting axes.

What is claimed is:
1. An injection-molded resin bevel gear comprising:
   a boss having an axis hole;
   a web extending from an outer circumference side of the boss in an outward radial direction; and
   a teeth section positioned on an outward-radial-direction side of the web and extending in a substantial axial direction from an inner to an outer end;
   wherein, the teeth section has a ring-shaped rim-shaped section having substantially a same thickness along a bottomland which is substantially a same thickness as a thickness of the web,
   the outward-radial-direction side of the web is connected to an inner end of the ring-shaped rim-shaped section that is one end in a tooth-width direction of the teeth section,
   in the ring-shaped rim-shaped section, a section of the ring-shaped rim-shaped section to which the web is coupled to at said outer end that is an other end in the tooth-width direction is connected to an outward-radial-direction end of a plurality of evenly-placed first radial direction ribs extending so as to radiate from the outer circumference side of the boss in the outward radial direction and along a side surface of the web,
   in the ring-shaped rim-shaped section, a section positioned between adjacent first radial direction ribs and closer to the inner end than the section to which the first radial direction ribs are coupled at said outer end is connected to outward-radial-direction ends of second radial direction ribs projecting from said side surface of the web,
   an inner circumference of said ring-shaped rim-shaped section increases from said inner end to said outer end in an axial direction, and
   a thickness of the first radial direction ribs and the second radial direction ribs is formed thinner than the thickness of the web and the ring-shaped rim-shaped section such that a flow of molten resin during injection molding is led from the web to the teeth section.

2. The injection-molded resin bevel gear according to claim 1, wherein the outward-radial-direction side of the web includes a horizontal beam section that bends in a direction along a direction in which a rotational center axis extends so as to project towards said inner end of the teeth section, and a base end section that extends from a tip of the horizontal beam section in the outward radial direction and is connected to the outer circumference side of the boss.

3. The injection-molded resin bevel gear according to claim 1, wherein the teeth section is substantially disc-shaped, has a shoulder-shaped section that is positioned away from an outer end of the teeth section and on said outer end side of said ring-shaped rim-shaped section, and extends from the ring-shaped rim-shaped section in the outward radial direction to a position with substantially a same diameter as a crown diameter.

4. The injection-molded resin bevel gear according to claim 2, wherein the teeth section is substantially disc-shaped, has a shoulder-shaped section that is positioned away from said outer end of the teeth section and on the outer end side of the ring-shaped rim-shaped section, and extends from the ring-shaped rim-shaped section in the outward radial direction to a position with substantially a same diameter as a crown diameter.

5. The injection-molded resin bevel gear according to claim 1, wherein said axis hole in said boss comprises a pair of opposing flat sections and a pair of opposing arc-shaped sections.

6. The injection-molded resin bevel gear according to claim 2, further comprising a plurality of evenly spaced third radial direction ribs extending from said ring-shaped rim-shaped section adjacent said inner end to said horizontal beam section.

7. The injection-molded resin bevel gear according to claim 1, further comprising a circumferential direction rib which is formed concentric with said boss, the circumferential rib projecting from an upper end of a vertical beam section of the web in a direction of axis and being formed so as to connect adjacent two first radial direction ribs.

8. The injection-molded resin bevel gear according to claim 7, wherein an inner end in a radial direction of said second redial direction rib is connected to an outer circumferential surface of said circumferential direction rib.

9. The injection-molded resin bevel gear according to claim 1, wherein said ring-shaped rim-shaped section is provided at a slope angle corresponding to the root angle of the injection molded resin bevel gear.

* * * * *